(12) United States Patent
Shen

(10) Patent No.: US 11,241,668 B2
(45) Date of Patent: Feb. 8, 2022

(54) AMBIENT HUMIDITY CONTROL ARTICLE

(71) Applicant: SHANGHAI HENGYUAN MACROMOLECULAR MATERIALS CO., LTD., Shanghai (CN)

(72) Inventor: Sandra Shen, Shanghai (CN)

(73) Assignee: SHANGHAI HENGYUAN MACROMOLECULAR MATERIALS CO., LTD, Shanghai (CN)

( * ) Notice: Subject to any disclaimer, the term of this patent is extended or adjusted under 35 U.S.C. 154(b) by 818 days.

(21) Appl. No.: 16/084,975

(22) PCT Filed: Jul. 20, 2018

(86) PCT No.: PCT/CN2018/096462
§ 371 (c)(1),
(2) Date: Sep. 14, 2018

(87) PCT Pub. No.: WO2020/000542
PCT Pub. Date: Jan. 2, 2020

(65) Prior Publication Data
US 2020/0298203 A1    Sep. 24, 2020

(30) Foreign Application Priority Data

Jun. 29, 2018  (CN) .......................... 201810700461.8

(51) Int. Cl.
*B01J 20/22* (2006.01)
*D06M 13/148* (2006.01)
(Continued)

(52) U.S. Cl.
CPC ............. *B01J 20/223* (2013.01); *B01J 20/22* (2013.01); *D06M 13/148* (2013.01); *D06M 13/188* (2013.01); *D06M 2101/06* (2013.01)

(58) Field of Classification Search
None
See application file for complete search history.

(56) References Cited

U.S. PATENT DOCUMENTS 5,846,450 A * 12/1998 Atkinson ............... F24F 3/1417
                                                     252/69
5,936,178 A *  8/1999 Saari ...................... B65D 81/24
                                                     84/453

(Continued)

*Primary Examiner* — Joseph D Anthony
(74) *Attorney, Agent, or Firm* — Im IP Law; Chai Im; C. Andrew Im

(57) ABSTRACT

An ambient humidity control article for controlling the ambient humidity within 45%-55%. The article includes a substrate having a predetermined water absorbability, and a humidity control layer coated on the substrate. The amount of the composition coated on per cubic centimeter of the substrate is 0.54-0.74 grams. The composition includes at least one organic acid salt, at least one polyol and water. The count of carbon in the polyols is not greater than 5. The weight percentage of the organic acid salt and the polyols in the composition is 30.6%-58.8% and 9.3%-26.7%, respectively. The water absorption amount of the substrate is not less than 0.5 grams per cubic centimeter. The article can control the ambient humidity without the need to pre-adjust the objective space. The article has a large capacity of moisture absorption and desorption, and can quickly achieve the desired humidity.

10 Claims, 2 Drawing Sheets

(51) Int. Cl.
*D06M 13/188* (2006.01)
*D06M 101/06* (2006.01)

(56) References Cited

U.S. PATENT DOCUMENTS

| | | | | |
|---|---|---|---|---|
| 6,196,227 | B1* | 3/2001 | Tsushima | A61F 6/04 |
| | | | | 128/844 |
| 6,244,432 | B1* | 6/2001 | Saari | A24F 25/02 |
| | | | | 206/213.1 |
| 8,748,723 | B1* | 6/2014 | Egberg | B01D 53/263 |
| | | | | 84/453 |
| 10,926,216 | B2* | 2/2021 | Shen | F24F 11/0008 |
| 11,007,477 | B2* | 5/2021 | Shen | B01D 53/28 |
| 2003/0205694 | A1* | 11/2003 | Sapienza | C09K 3/18 |
| | | | | 252/70 |
| 2020/0188845 | A1* | 6/2020 | O'Shea | B01D 53/28 |
| 2020/0298176 | A1* | 9/2020 | Shen | B01D 53/28 |
| 2020/0298177 | A1* | 9/2020 | Shen | F24F 11/0008 |

* cited by examiner

AMBIENT HUMIDITY CONTROL ARTICLE

RELATED APPLICATIONS

This application is a § 371 application from PCT/CN2018/096462 filed Jul. 20, 2018, which claims priority from Chinese Patent Application No. 201810700461.8 filed Jun. 29, 2018, each of which is herein incorporated by reference in its entirety.

FIELD OF THE INVENTION

The present invention relates specifically to an ambient humidity control article.

BACKGROUND OF THE INVENTION

"Humidity" is an important factor that affects product packaging and storage life in all walks of life. Each product requires a reasonable humidity range to store. For example, camera lens requires to be stored within 45%-55% humidity range, the ambient humidity below the numerical value will make the rubber seal ageing, and the ambient humidity above the numerical value will make the lens foggy. The humidity to store products like wooden musical instruments is 45%-55%, the ambient humidity below the numerical value will cause wood deformation and may further affects the sound quality, and the ambient humidity above the numerical value will make wood moldy, or will make wood absorb a lot of moisture, causing the wood swell and damage wooden products.

In order to control the ambient humidity within 45%-55%, the common method is to use humidity control silica gel to control the ambient humidity. However, the use of humidity control silica gel is not in line with green products. During the production of humidity control silica gel, a lot of wastewater will be produced. In order to protect the environment, many silicone raw material factories are closed for rectification. This has led various industries to start to comprise desiccant product, which is the least important in the original list of materials table, in the procurement list of important materials.

Therefore, there is an urgent need for an alternative to humidity control silica gel, and the alternative must be in line with the green and environment theme.

SUMMARY OF THE INVENTION

The present invention is made for solving the above problems and aims to provide an ambient humidity control article.

The present invention provides an ambient humidity control article for use in controlling ambient humidity within 45%-55%, comprising: the substrate, which has a certain water absorbability; the humidity control layer, which is coated on the substrate and made up of humidity control composition. Wherein the amount of the humidity control composition coated on per cubic centimeter of the substrate is 0.54-0.74 grams. The humidity control composition comprises at least one of organic acid salt, at least one of polyols and water, the organic acid salt comprises at least one of sodium lactate, potassium lactate and sodium formate, the count of carbon in the polyols is not greater than 5, the weight percentage of the organic acid salt in the humidity control composition is 30.6%-58.8%, the weight percentage of the polyols in the humidity control composition is 9.3%-26.7%, the water absorption amount of the substrate is not less than 0.5 grams per cubic centimeter.

Further, the ambient humidity control article can also have the following features: wherein the weight percentage of the organic acid salt in the humidity control composition is 44.4%-46.2%, the weight percentage of the polyols in the humidity control composition is 13.3%-20.5%.

Further, the ambient humidity control article can also have the following features: wherein the organic acid salt is sodium lactate, the polyols is glycerol.

Further, the ambient humidity control article can also have the following features: wherein the organic acid salt is sodium lactate, the polyols is ethylene glycol.

Further, the ambient humidity control article can also have the following features: wherein the organic acid salt is sodium formate, the polyols is glycerol.

Further, the ambient humidity control article can also have the following features: wherein the organic acid salt is potassium lactate, the polyols is ethylene glycol.

Further, the ambient humidity control article can also have the following features: wherein there are two kinds of the organic acid salt, respectively sodium lactate and potassium lactate, the polyols is ethylene glycol, the weight percentage of the sodium lactate in the humidity control composition is 15.6%-45%, the weight percentage of the potassium lactate in the humidity control composition is 10%-30%, the total weight percentage of the sodium lactate and the potassium lactate in the humidity control composition is 30.6%-58.8%.

Further, the ambient humidity control article can also have the following features: wherein the material of said substrate is any one of paper type material, cotton, chemical fiber material, non-woven fabric, felt, porous plastic and mineral-based material.

Further, the ambient humidity control article can also have the following features: package bag, wherein the package bag is used to hold the substrate coated with the humidity control composition.

Further, the ambient humidity control article can also have the following features: wherein the material of the package bag is polyester.

The Effect of the Present Invention

The ambient humidity control article according to the present invention comprises: substrate, which has a certain water absorbability; humidity control layer, which is coated on the substrate and made up of humidity control composition. Wherein the amount of the humidity control composition coated on per cubic centimeter of the substrate is 0.54~0.74 grams, the humidity control composition comprises at least one of organic acid salt, at least one of polyols and water, the organic acid salt comprises at least one of sodium lactate, potassium lactate and sodium formate, the count of carbon in the polyols is not greater than 5, the weight percentage of the organic acid salt in the humidity control composition is 30.6%-58.8%, the weight percentage of the polyols in the humidity control composition is 9.3%-26.7%, the water absorption amount of the substrate is not less than 0.5 grams per cubic centimeter. Therefore, the ambient humidity control article of the present invention can control the ambient humidity within 45%-55%, does not need to pre-adjust the objective space, has large capacity of moisture absorption and desorption and can quickly achieve the desired humidity in the objective environment.

Moreover, since the ambient humidity control article of the present invention comprises only sodium lactate, potassium lactate and sodium formate in common, the composition manufactured by using the organic salt is not only cheap, but also safe for human body when manufacturing. The ambient humidity control article can let the users rest assured because it does not corrode the camera lens or the instrument at all when protecting a camera lens or a wooden instrument. In addition, the ambient humidity control article of the present invention is still friendly to the natural environment after being discarded, and can be decomposed naturally without causing secondary pollution.

DETAILED DESCRIPTION OF THE PREFERRED EMBODIMENTS

Embodiment 1

Figure 1:
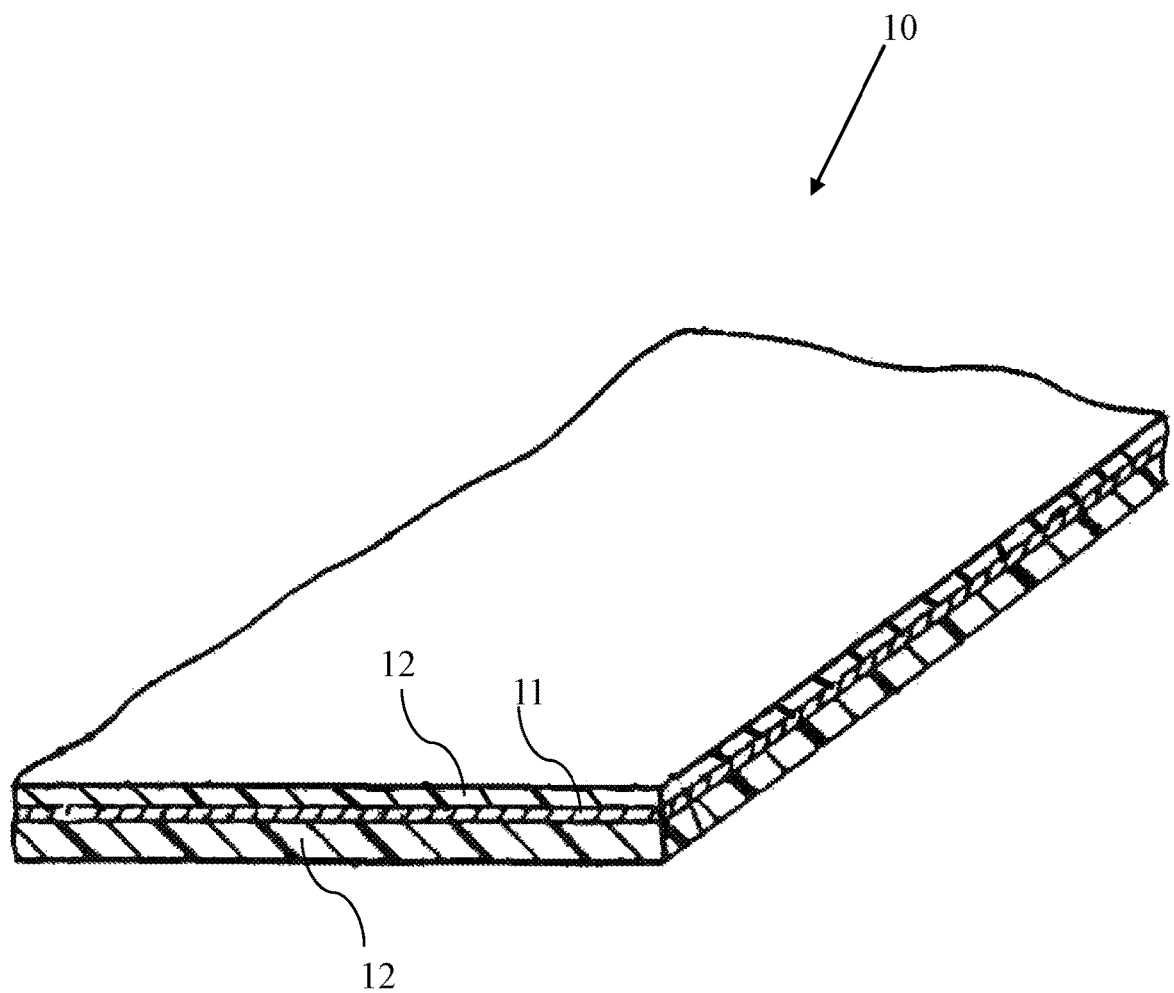
FIG. 1 is a schematic diagram of structure showing the ambient humidity control article in embodiment 1.

FIG. 1 is a schematic diagram of structure showing the ambient humidity control article in embodiment 1.

With respect to FIG. 1, the ambient humidity control article 10 in embodiment 1 is used to control ambient humidity within 45%-55%. The ambient humidity control article 10 comprises substrate 11 and humidity control layer 12 coated on the substrate.

Substrate 11 has a certain water absorbability, the water absorption amount of the substrate is not less than 0.5 grams per cubic centimeter. The material of the substrate is any one of paper type material, cotton, chemical fiber material, non-woven fabric, felt, porous plastic, mineral-based material. In the embodiment 1, cotton-wood pulp paper in paper type material is selected as the substrate. The water absorption amount of the cotton-wood pulp paper is at least 0.8 grams per cubic centimeter, the water-retaining property amount of the cotton-wood pulp paper is at least 1.2 grams per cubic centimeter. For easy tailoring, the thickness of the cotton wood pulp paper is 0.2 mm-3 mm.

The size of the substrate can be tailored to the needs of customers and the size is 1 cm×1 cm-60 cm×60 cm.

Humidity control layer 12 is made up of humidity control composition. The humidity control composition comprises sodium lactate, glycerol and water. The weight percentage of sodium lactate in the composition is 30.6%-58.8%. The weight percentage of glycerol in the composition is 9.3%-26.7%.

The purity of the sodium lactate is not less than 99.9%. The purity of the glycerol is not less than 99.9%. The water is deionized water.

The amount of the humidity control composition coated on per cubic centimeter of the substrate is 0.54 grams.

Embodiment 2

Figure 2:
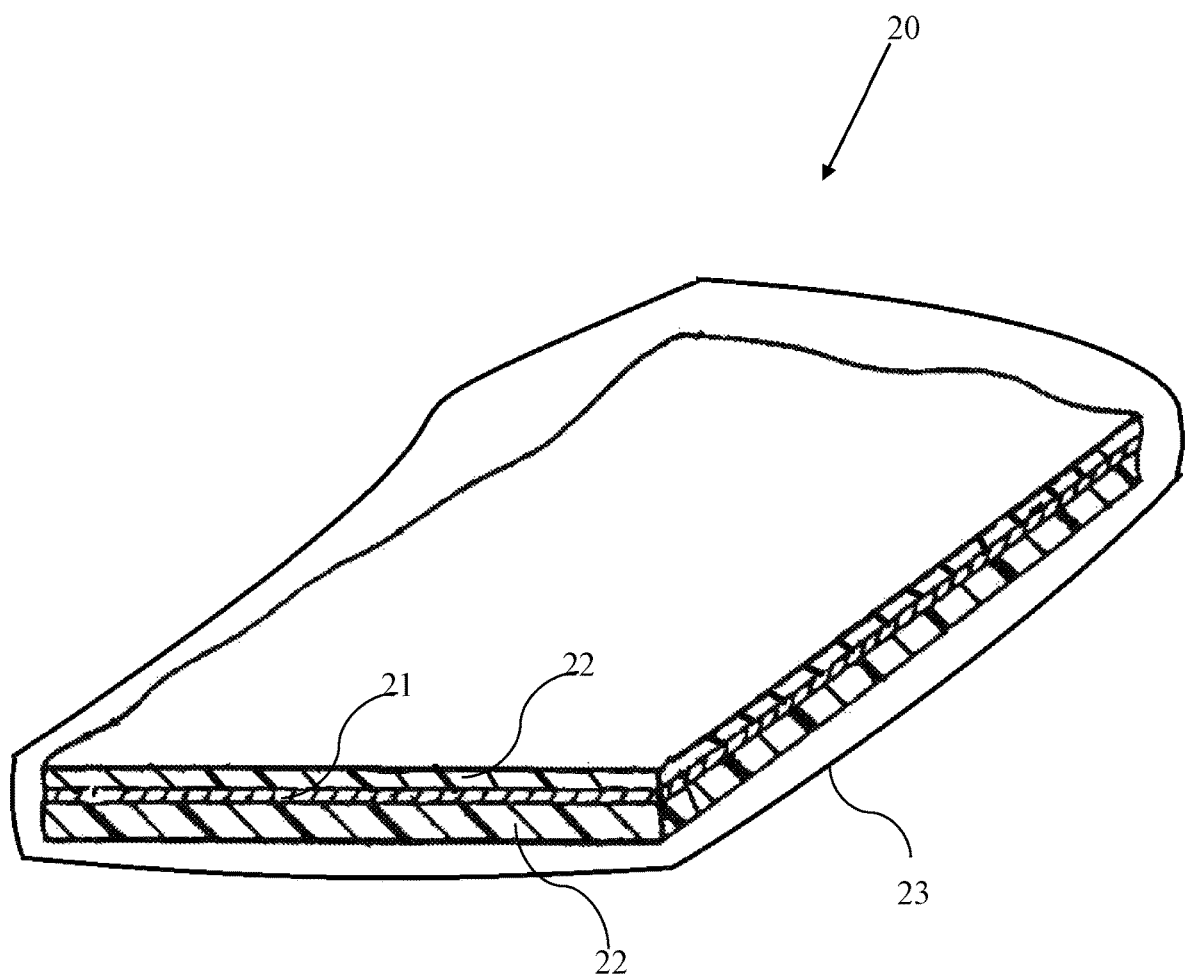
FIG. 2 is a schematic diagram of structure showing the ambient humidity control article in embodiment 2.

FIG. 2 is a schematic diagram of structure showing the ambient humidity control article in embodiment 2.

With respect to FIG. 2, the ambient humidity control article 20 in embodiment 2 comprises substrate 21, humidity control layer 22 coated on the substrate 21 and package bag 23 for use in holding the substrate 21.

Substrate 21 has a certain water absorbability, the water absorption amount of the substrate is not less than 0.5 grams per cubic centimeter. The material of the substrate is any one of paper type material, cotton, chemical fiber material, non-woven fabric, felt, porous plastic, mineral substrate. In the embodiment 2, cotton is selected as the substrate. The water absorption amount of the cotton is at least 0.8 grams per cubic centimeter, the water-retaining property amount the cotton is at least 1.2 grams per cubic centimeter. For easy tailoring, the thickness of the cotton is 2 mm.

Humidity control layer 22 is made up of humidity control composition. The humidity control composition comprises sodium lactate, glycerol and water. The weight percentage of sodium lactate in the humidity control composition is 44.4%-46.2%. The weight percentage of glycerol in the humidity control composition is 13.3%-20.5%.

The purity of the sodium lactate is not less than 99.9%. The purity of the glycerol is not less than 99.9%. The water is deionized water.

The amount of the humidity control composition coated on per cubic centimeter of the substrate is 0.64 grams.

The package bag 23 is used to hold the substrate coated with the humidity control composition. The package bag is made of thin-walled material that can permeate water vapor but not permeate liquid solution such as non-woven fabric, composite plastic, paper-plastic composite and cloth. Non-woven fabric is selected as the material of the package bag in the embodiment 2.

When the weight percentage of the sodium lactate and the glycerol is greater than the percentage range, crystallization is easy to occur in the composition which requires high temperature to dissolve, resulting in high loss and making the weight of the composition being unstable. When the weight percentage of the sodium lactate and the glycerol is lower than the percentage range, it takes much longer time to manufacture the ambient humidity control article and the humidity control capability will decrease.

Embodiment 3

In embodiment 3, the same instructions are omitted for the same structure as in embodiment 1.

Humidity control layer 12 is made up of humidity control composition. The humidity control composition comprises sodium lactate, ethylene glycol and water. The weight percentage of sodium lactate in the humidity control composition is 44.4%-46.2%. The weight percentage of ethylene glycol in the humidity control composition is 13.3%-20.5%.

The purity of the sodium lactate is not less than 99.9%. The purity of the ethylene glycol is not less than 99.9%. The water is deionized water.

The amount of the humidity control composition coated on per cubic centimeter of the substrate is 0.74 grams.

Embodiment 4

In embodiment 4, the same instructions are omitted for the same structure as in embodiment 1.

Humidity control layer 12 is made up of humidity control composition. The humidity control composition comprises sodium formate, ethylene glycol and water. The weight percentage of sodium formate in the humidity control composition is 44.4%-46.2%. The weight percentage of ethylene glycol in the humidity control composition is 13.3%-20.5%.

The purity of the sodium formate is not less than 99.9%. The purity of the ethylene glycol is not less than 99.9%. The water is deionized water.

The amount of the humidity control composition coated on per cubic centimeter of the substrate is 0.64 grams.

Embodiment 5

In embodiment 5, the same instructions are omitted for the same structure as in embodiment 1.

Humidity control layer 12 is made up of humidity control composition. The humidity control composition comprises potassium lactate, glycerol and water. The weight percentage of potassium lactate in the humidity control composition is 44.4%-46.2%. The weight percentage of glycerol in the humidity control composition is 13.3%-20.5%.

The purity of the potassium lactate is not less than 99.9%. The purity of the glycerol is not less than 99.9%. The water is deionized water.

The amount of the humidity control composition coated on per cubic centimeter of the substrate is 0.64 grams.

Embodiment 6

In embodiment 6, the same instructions are omitted for the same structure as in embodiment 1.

Humidity control layer 12 is made up of humidity control composition. The humidity control composition comprises potassium lactate, ethylene glycol and water. The weight percentage of potassium lactate in the humidity control composition is 44.4%-46.2%. The weight percentage of ethylene glycol in the humidity control composition is 13.3%-20.5%.

The purity of the potassium lactate is not less than 99.9%. The purity of the ethylene glycol is not less than 99.9%. The water is deionized water.

The amount of the humidity control composition coated on per cubic centimeter of the substrate is 0.64 grams.

Embodiment 7

In embodiment 7, the same instructions are omitted for the same structure as in embodiment 1.

Humidity control layer 12 is made up of humidity control composition. The humidity control composition comprises sodium lactate, potassium lactate, ethylene glycol and water. The weight percentage of sodium lactate in the humidity control composition is 15.6%-45%. The weight percentage of potassium lactate in the humidity control composition is 10%-30%. The total weight percentage of sodium lactate and potassium lactate in the humidity control composition is 30.6%-58.8%. The weight percentage of ethylene glycol in the humidity control composition is 13.3%-20.5%.

The purity of the sodium lactate is not less than 99.9%. The purity of the potassium lactate is not less than 99.9%. The purity of the ethylene glycol is not less than 99.9%. The water is deionized water.

The amount of the humidity control composition coated on per cubic centimeter of the substrate is 0.64 grams.

Take the embodiment 2 as an example, the amount of the humidity control composition in the ambient humidity control article for use in controlling different ambient humidity is a fixed value and there are all 0.64 grams humidity control composition coating on per cubic centimeter of substrate. However, the weight percentage of sodium lactate, glycerol and water in the humidity control composition is different, respectively

| Ambient humidity (%) | Sodium lactate (%) | Glycerol (%) | $H_2O$ (%) |
|---|---|---|---|
| 45 | 45.5 | 20.5 | 34.0 |
| 50 | 46.2 | 16.1 | 37.7 |
| 55 | 44.4 | 13.3 | 42.3 |

The area of the 1 kilogram ambient humidity control article in embodiment 2 is 0.42 $m^2$ and the thickness is 0.3 cm. The ambient humidity control article is used to control the humidity of 1 cubic meters closed space (no external gas exchange), under the condition that the initial temperature is 25° C. and the range of the initial humidity is 10%-90%, the ambient humidity will be controlled within 45%-55% in 24 hours and the humidity control is long-term and effective. If the gas in the closed space is exchanged with the external gas with a humidity range of 40% for a long time and the effective time of humidity control is 1 month.

The Effect of the Embodiments

The ambient humidity control article according to the foregoing embodiments comprises: substrate, which have a certain water absorbability; humidity control layer, which is coated on the substrate. Wherein the amount of the humidity control composition coated on per cubic centimeter of the substrate is 0.64 grams, the humidity control composition comprises at least one of organic acid salt, at least one of polyols and water, the organic acid salt comprises at least one of sodium lactate, potassium lactate and sodium formate, the count of carbon in the polyols is not greater than 5, the weight percentage of the organic acid salt in the humidity control composition is 30.6%-58.8%, the weight percentage of the polyols in the humidity control composition is 9.3%-26.7%, the water absorption amount of the substrate is not less than 0.5 grams per cubic centimeter. Therefore, the ambient humidity control article of the foregoing embodiments can control the ambient humidity within 45%-55%, does not need to pre-adjust the objective space, has large capacity of moisture absorption and desorption and can quickly achieve the desired humidity in the objective environment.

Moreover, since the ambient humidity control article of the foregoing embodiments comprises only sodium lactate, potassium lactate and sodium formate in common, the composition manufactured by using the organic salts is not only cheap, but also safe for human body when manufacturing. The ambient humidity control article can let the users rest assured because it does not corrode the camera lens or the instrument at all when protecting a camera lens or a wooden instrument. In addition, the ambient humidity control article of the present invention is still friendly to the natural environment after being discarded, and can be decomposed naturally without causing secondary pollution.

The foregoing embodiments are preferred cases of the present invention and is not used to limit the scope of protection of the present invention.

In the foregoing embodiments, the polyols of the humidity control composition in the ambient humidity control article are glycerol and ethylene glycol, however, polyols with a carbon content of not more than 5 can achieve the same effect as a component of the humidity control composition in the ambient humidity control article of the present invention.

The invention claimed is:

1. An ambient humidity control article to control an ambient humidity within 45%-55%, comprising:
   a substrate, which has a predetermined water absorbability;
   a humidity control layer, which is coated on the substrate and comprising a humidity control composition;
   wherein an amount of the humidity control composition coated on per cubic centimeter of the substrate is 0.54-0.74 grams;
   the humidity control composition comprises an organic acid salt, at least one polyol and water;
   the organic acid salt comprises at least one of sodium lactate, potassium lactate and sodium formate;
   a count of carbon in said at least one polyol is not greater than 5;
   a weight percentage of the organic acid salt in the humidity control composition is 30.6%-58.8%;
   a weight percentage of said at least one polyol in the humidity control composition is 9.3%-26.7%; and
   a water absorption amount of the substrate is not less than 0.5 grams per cubic centimeter.

2. The ambient humidity control article according to claim 1, wherein the weight percentage of the organic acid salt in the humidity control composition is 44.4%-46.2%; and wherein the weight percentage of said at least one polyol in the humidity control composition is 13.3%-20.5%.

3. The ambient humidity control article according to claim 1, wherein the organic acid salt is the sodium lactate; and wherein said at least one polyol is a glycerol.

4. The ambient humidity control article according to claim 1, wherein the organic acid salt is the sodium lactate; and wherein said at least one polyol is an ethylene glycol.

5. The ambient humidity control article according to claim 1, wherein the organic acid salt is the sodium formate; and wherein said at least one polyol is a glycerol.

6. The ambient humidity control article according to claim 1, wherein the organic acid salt is the potassium lactate; and wherein said at least one polyol is an ethylene glycol.

7. The ambient humidity control article according to claim 1, wherein the comprises two of the organic acid salts, a first organic acid salt is the sodium lactate and a second organic acid salt is the potassium lactate; wherein said at least one polyol is an ethylene glycol; wherein a weight percentage of the sodium lactate in the composition is 15.6%-45%; wherein a weight percentage of the potassium lactate in the composition is 10%-30%; and wherein a total weight percentage of the sodium lactate and the potassium lactate in the composition is 30.6%-58.8%.

8. The ambient humidity control article according to claim 1, wherein the substrate comprises one of the following materials: a paper type material, cotton, chemical fiber material, non-woven fabric, felt, porous plastic and mineral-based material.

9. The ambient humidity control article according to claim 1, further comprising a package bag, the package bag being configured to hold the substrate coated with the humidity control composition.

10. The ambient humidity control article according to claim 9, wherein the paper bag comprises one of the following materials: a non-woven fabric, composite plastic, paper-plastic composite and cloth.

* * * * *